United States Patent [19]

Minakawa et al.

[11] 4,032,125

[45] June 28, 1977

[54] INSULATOR

[75] Inventors: Masaaki Minakawa, Kokubunji; Toshio Yoshikawa, Ayase, both of Japan

[73] Assignee: Nissan Motor Co., Ltd., Japan

[22] Filed: Mar. 9, 1976

[21] Appl. No.: 665,336

[30] Foreign Application Priority Data

Mar. 17, 1975 Japan .................. 50-34656[U]

[52] U.S. Cl. ............................................. 267/63 A
[51] Int. Cl.² ........................................ B60G 11/24
[58] Field of Search .......... 267/21 R, 21 A, 57.1 R, 267/63 R, 63 A, 141, 152, 153; 248/358 R

[56] References Cited

UNITED STATES PATENTS

| 2,482,488 | 9/1949 | Julien | 267/63 A |
|---|---|---|---|
| 2,706,113 | 4/1955 | Hickman | 267/21 R |
| 2,739,821 | 3/1956 | Hickman | 267/63 A X |
| 3,692,326 | 9/1972 | Hickman | 267/63 A X |
| 3,857,556 | 12/1974 | Wing | 267/63 A |

FOREIGN PATENTS OR APPLICATIONS 1,273,182  8/1961  France .......................... 267/63 R Primary Examiner—Johnny D. Cherry
Attorney, Agent, or Firm—Robert E. Burns; Emmanuel J. Lobato; Bruce L. Adams

[57] ABSTRACT

An insulator employing elastomeric blocks in compression and in shear is disclosed. It comprises an inner member having a wedge, an outer member around the wedge and spaced therefrom and two resilient means, each including alternative layers of rigid plates and elastomeric blocks, disposed on the opposite sides of the wedge and operatively connected between the wedge and the outer member.

3 Claims, 6 Drawing Figures

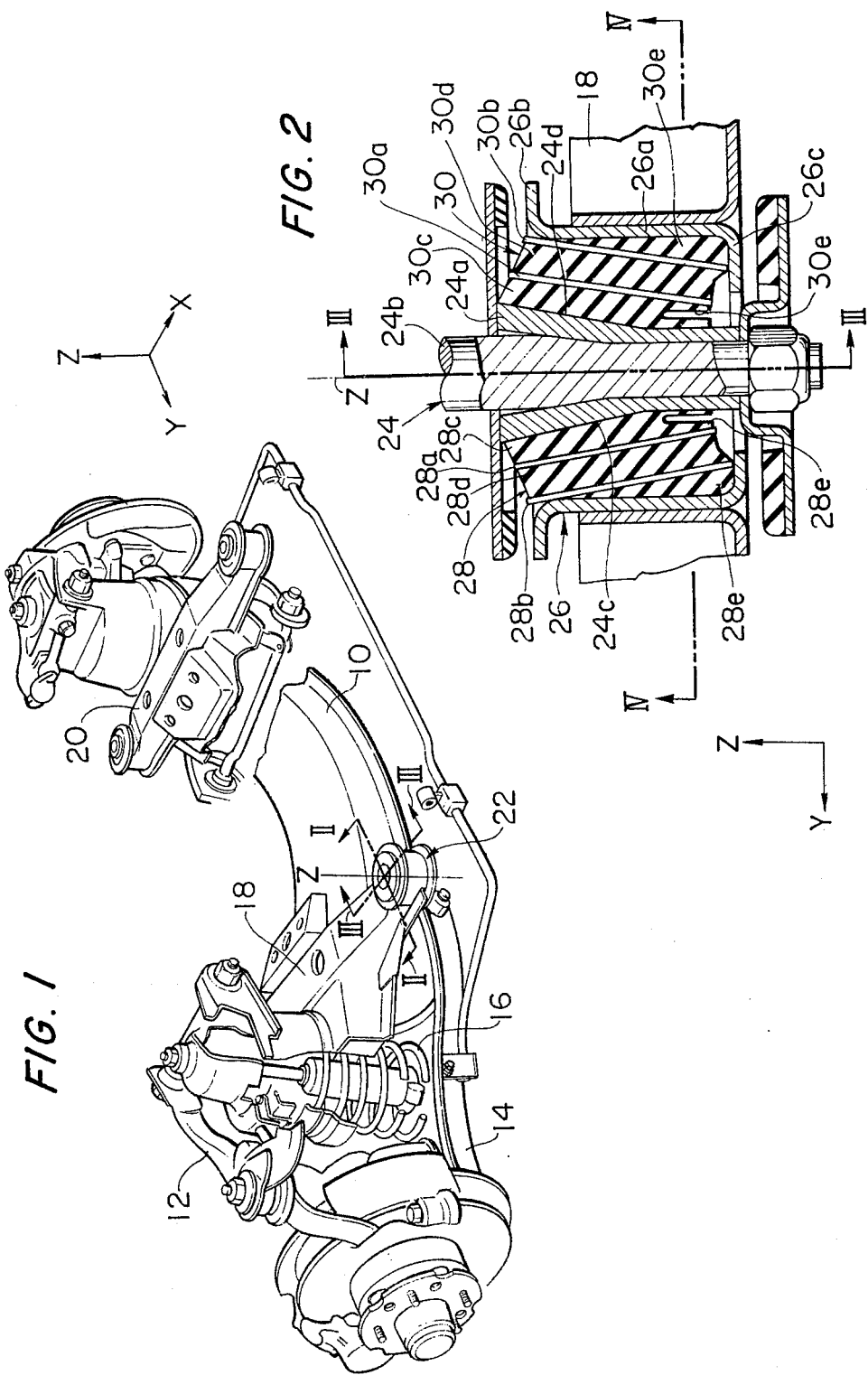

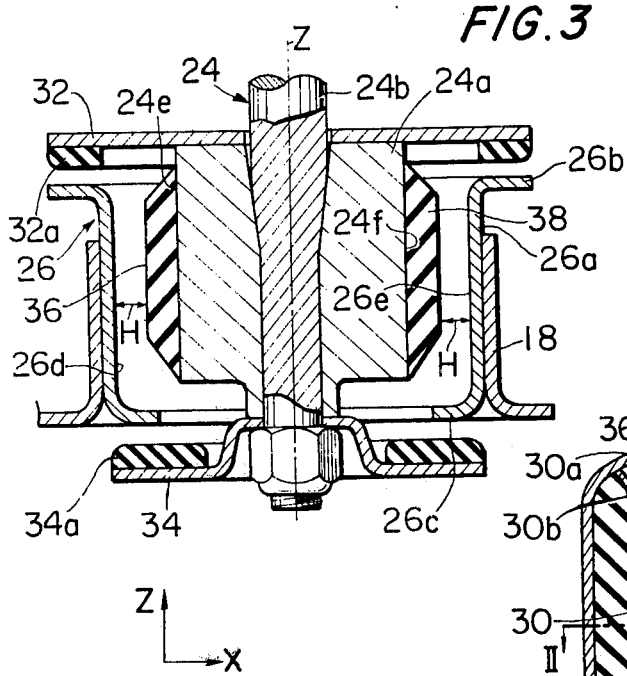
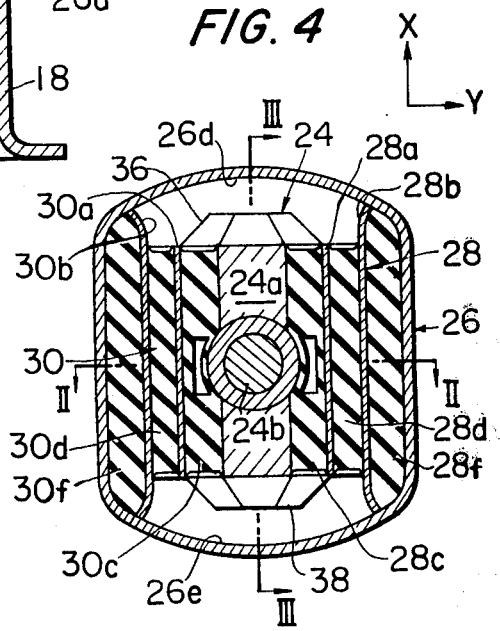
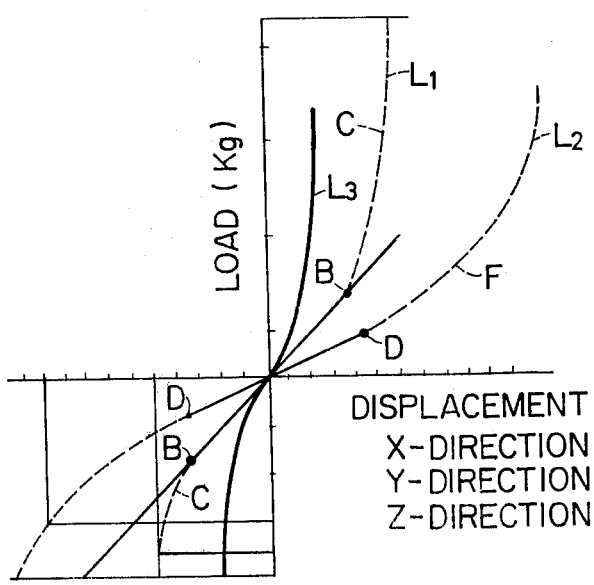
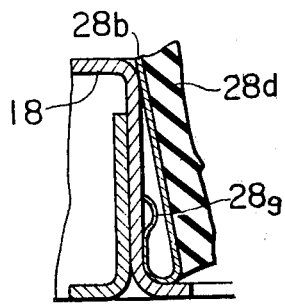

INSULATOR

BACKGROUND OF THE INVENTION

The present invention relates to an insulator and more particularly to an insulator which may be interposed between a vehicle superstructure and a suspension member of a wheel suspension system.

A vehicle superstructure must be mounted on a support member of a wheel suspension system so that there may exist a relatively great yieldingness in a longitudinal direction of the vehicle and there may exist a relatively less yieldingness in a vertical direction of the vehicle for a comfortable drive, but there may exist no or only a slight yieldingness in a lateral direction of the vehicle for good steerability.

SUMMARY OF THE INVENTION

A main object of the present invention is to provide a compact insulator which when, in use, interposed between a vehicle superstructure and a suspension member of a wheel suspension system, can meet the requirement mentioned above.

Another object of the present invention is to provide an insulator which employs elastomeric blocks in compression and/or in shear.

BRIEF DESCRIPTION OF THE DRAWINGS

Other features and advantages of the present invention will become clear from the following description in connection with the accompanying drawings, in which:

FIG. 1 is a perspective plan view, partly in section, of a front wheel suspension system having a supporting member on which a plurality of insulators according to the present invention are mounted.

FIG. 2 is a side view of one of the insulators, partly broken away to show a section taken along line II—II shown in FIG. 1.

FIG. 3 is a side view of the insulator, partly broken away to show a section along line III—III shown in FIG. 1.

FIG. 4 is a section taken through line IV—IV shown in FIG. 2.

FIG. 5 shows load vs. displacement characteristic curves of the insulator according to the present invention.

FIG. 6 is a fragmentary section showing the modification of an insulator according to the present invention.

DESCRIPTION OF THE PREFERRED EMBODIMENTS

Referring to the accompanying drawings and particularly to FIG. 1, an independent knee-action front suspension system is illustrated in which the suspension member or chassis of a vehicle, indicated at 10, has on each of its ends a pair of upper and lower wishbones 12 and 14 and between them is a coil spring 16 held under compression. Formed on the suspension member 10 are two platforms 18 and 20 on which a vehicle superstructure (not shown) is mounted. A plurality of insulators, only one being designated at 22, according to the present invention are interposed between the vehicle superstructure and the platforms 18 and 20.

Turning now to FIGS. 2, 3 and 4, the insulator 22 comprises a rigid inner member 24 adapted to be secured to the vehicle superstructure, a rigid outer member 26 fixedly carried by the platform 18 on the suspension member 10 and two resilient units 28 and 30, each including two rigid plates 28a and 28b or 30a and 30b, a center block of rubber 28c or 30c and an outer block of rubber 28d or 30d. The plates 28a and 28b (or 30a and 30b) and blocks of rubber 28c and 28d (or 30c and 30d) are bonded one after another to form alternate layers of plates and rubber. As seen in FIGS. 2 and 4, the center block of rubber 28c or 30c is formed with a slot 28e or 30e.

The inner member 24 includes a wedge 24a through which a shaft 24b extends. The wedge 24a is formed with two side surfaces 24c and 24d which are inclined toward each other as the shaft 24b extends downwardly as viewed in FIG. 3 and disposed symmetrically about the axis Z of the shaft 24b.

The outer member 26 includes a tubular section 26a which has an upper flange 26b extending outwardly from the upper end thereof and an lower flange 26c extending inwardly from the lower end thereof. The tubular section 26a surrounds the wedge 24a and is spaced therefrom.

As seen in FIGS. 2 and 4 the resilient units 28 and 30 are held compressed between the wedge 24a and the tubular section 26a. Each of the resilient units, such as 28, is connected to one of the inclined surfaces 24c at its inner layer 28c and to the tubular section 26a at its outer layer 28b and the layers of plates of each resilient unit, such as 28a and 28b, are disposed in parallel to the inclined surface 24c. Bonded to the inclined surfaces 24c and 24d are the inner layers of rubber 28c and 30, respectively.

The outer layer of plate of each resilient unit, such as 28b, is fixed with respect to the outer member 26 by abutting its upper and lower ends against the upper end of the tubular section 26a and against the lower flange 26c, respectively (see FIG. 2) and by abutting its lateral ends against the tubular section 26a (see FIG. 4). To hold the plate 28b in the proper inclination, a spacer in the form of a block of rubber 28f fills the space between the plate 28b and the adjacent wall of the tubular section 26a as illustrated in FIGS. 2 and 4, or the spacer may take the form of a turned portion 28g formed at the lower end of the plate 28b which engages the outer member 26 as illustrated in FIG. 6.

Upper and lower end members 32 and 34 are fixedly carried by the shaft 24b in abutting engagement with the upper and lower ends of the wedge 24a and in spaced relation with the upper and lower flanges 26b and 26c. The upper and lower end members 32 and 34 engage the upper and lower flanges 26b and 26c, respectively, to limit movement of the wedge 24a in a direction along the axis Z. To prevent direct contact between the upper end member 32 and upper flange 26b, an annular member of rubber 32a is bonded to the upper end member 32. For the similar purpose another annular member of rubber 34a is bonded to the lower end member 34.

For limiting movement of the wedge 24a in a direction that is parallel to the two inclined surfaces 24c and 24d of the wedge 24a and perpendicular to the axis Z of the shaft, stoppers of rubber 36 and 38 are bonded to end surfaces 24e and 24f, respectively, as seen in FIGS. 3 and 4 and these stoppers 36 and 38 are equally spaced from the adjacent walls 26d and 26e by a predetermined distance H (see FIG. 3).

Upon displacement of the inner member 24 in a direction that is parallel to the inclined surfaces 24c and 24d of the wedge 24 and perpendicular to the axis Z, that is, displacement of the inner member 24 in a direction along the X-axis (see FIGS. 1, 3 and 4), the blocks of rubber 28c, 28d, 30c and 30d will be subject to a shear, thereby to absorb relatively little mechanical shocks in this direction. If a mechanical shock great enough to cause one of the stoppers 36 and 38 (see FIGS. 3 and 4) to abut the adjacent walls 26d and 26e is applied to the inner member 24, the stopper 36 or 38 will be compressed between the wedge 24a and the adjacent wall 26d or 26e, thereby to minimize the mechanical shock. It will be understood from the comparison of FIG. 3 with FIG. 1 that displacement of the vehicle superstructure with respect to the suspension member 10 in a longitudinal direction of the vehicle can be absorbed by the shear of rubber of the resilient units.

An angle between each of the inclined surfaces and the axis Z is a predetermined amount, approximately 8.5° in this embodiment, and the rigid planes 28a, 28b, 30a and 30b are parallel to the two inclined surfaces 24c and 24d. The predetermined amount should be so selected as to cause shear and compression of the blocks of rubber 28c, 28d, 30c and 30d upon displacement of the inner member 24 relative to the outer member 26 in a direction along the Z-axis (see FIGS. 1 and 2) and to cause compression of these blocks of rubber upon displacement of the inner member 24 in a direction along the Y-axis (FIGS. 1, 2 and 4).

Referring to FIG. 5 curve $L_1$ represents load vs. displacement in a direction along Z-axis, in which range B—B is due to shear in combination with compression of the resilient units and range C (illustrated by broken lines) is due to compression of the annular members 32a and 34a. Curve $L_2$ represents load vs. displacement in a direction along X-axis, in which range D—D is due to shear the resilient units and range F (illustrated by broken lines) is due to compression of stoppers 36 and 38. Curve $L_3$ represents load vs. displacement in a direction along Y-axis due only to compression of the resilient units.

As will now be understood from the preceding an insulator according to the present invention meets all the requirements demanded as an insulator for motor vehicle suspension systems, with compact volume.

What is claimed is:
1. An insulator comprising:
   an inner member with an axis having a wedge, said wedge including two surfaces which are inclined toward each other and disposed symmetrically about said axis;
   an outer member around said wedge and spaced therefrom; and
   two resilient means, each including alternate layers of rigid plates and elastomeric members, and inner one of said alternate layers of each of said two resilient means being connected to one of said two surfaces of said wedge and an outer one of said alternate layers being connected to said outer member, said rigid plates of each of said two resilient means being disposed in parallel to one of said two surfaces of said wedge;
   said inner member having two elastomeric parts on said wedge, each of said two elastomeric parts of said inner member being compressed between said wedge and said outer member to limit movement of said inner member relative to said outer member in a direction which is parallel to said two surfaces of said wedge and perpendicular to said axis,
   said outer member having a tubular section having two open ends and said inner member having two axially spaced end members spaced from said two open ends of said tubular section and two elastomeric parts fixed to said end members, respectively, to limit movement of said inner member relative to said outer member in a direction along said axis.
2. An insulator as claimed in claim 1, in which said outer layer is a rigid plate and in which a spacer in the form of a block of elastomeric material fills a space between said outer layer and said outer member to hold said outer layer in proper inclination relative to said outer member.
3. An insulator as claimed in claim 1, in which said outer layer is a rigid plate and in which a spacer in the form of a turned portion formed on said outer layer holds said outer layer in proper inclination relative to said outer member.

* * * * *